United States Patent
Gu et al.

(10) Patent No.: US 9,888,446 B2
(45) Date of Patent: Feb. 6, 2018

(54) METHOD AND A FIRST NETWORK NODE FOR CONTROLLING LOAD

(75) Inventors: Xinyu Gu, Beijing (CN); Torbjörn Wigren, Uppsala (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 289 days.

(21) Appl. No.: 14/397,961

(22) PCT Filed: May 17, 2012

(86) PCT No.: PCT/CN2012/075661
§ 371 (c)(1),
(2), (4) Date: Nov. 3, 2014

(87) PCT Pub. No.: WO2013/170465
PCT Pub. Date: Nov. 21, 2013

(65) Prior Publication Data
US 2015/0092562 A1 Apr. 2, 2015

(51) Int. Cl.
*H04W 52/34* (2009.01)
*H04J 11/00* (2006.01)
(Continued)

(52) U.S. Cl.
CPC ........ *H04W 52/343* (2013.01); *H04B 17/345* (2015.01); *H04J 11/004* (2013.01);
(Continued)

(58) Field of Classification Search
CPC ............. H04W 52/343; H04W 72/0413; H04J 11/005; H04J 11/004; H04B 17/345;
(Continued)

(56) References Cited

U.S. PATENT DOCUMENTS

2008/0188260 A1* 8/2008 Xiao ................... H04W 52/146
455/522
2009/0088080 A1* 4/2009 Zhang ............... H04W 72/0486
455/63.1

FOREIGN PATENT DOCUMENTS

WO  WO 2007/026054 A1  3/2007
WO  WO 2008/039123     4/2008
(Continued)

OTHER PUBLICATIONS

Extended European Search Report for Application No./Patent No. 12877007.0-1852 / 2850889 PCT/CN2012075661, Nov. 11, 2015.
(Continued)

*Primary Examiner* — Kwang B Yao
*Assistant Examiner* — Moo Ryong Jeong
(74) *Attorney, Agent, or Firm* — Baker Botts, LLP

(57) ABSTRACT

A first network node (111) and a method therein for controlling load in a first cell (121) of the first network node (111) are provided. The first network node (111) comprises a multi-stage receiver. The first network node (111) computes an interference cancellation gain, at an intermediate stage of the multi-stage receiver. Furthermore, the first network node (111) estimates neighbor cell interference from interfering signals while accounting for a load utilization. The load utilization relates to power transmitted and power granted. The first network node (111) calculates a load measure for stability based on at least the interference cancellation gain and the neighbor cell interference. Next, the first network node (111) controls the load in the first cell (121) based on the load measure for stability.

20 Claims, 4 Drawing Sheets

(51) Int. Cl.
  *H04L 5/00* (2006.01)
  *H04W 72/04* (2009.01)
  *H04B 17/345* (2015.01)
  *H04L 25/03* (2006.01)

(52) U.S. Cl.
  CPC .......... *H04J 11/005* (2013.01); *H04L 5/0032* (2013.01); *H04L 5/0073* (2013.01); *H04W 72/0413* (2013.01); *H04L 5/0044* (2013.01); *H04L 25/03006* (2013.01)

(58) Field of Classification Search
  CPC .............. H04L 5/0032; H04L 5/0073; H04L 25/03006; H04L 5/0044
  See application file for complete search history.

(56) References Cited

FOREIGN PATENT DOCUMENTS

| WO | WO 2011/136706 | 11/2011 |
|---|---|---|
| WO | WO 2011/155882 | 12/2011 |
| WO | WO 2012/044215 | 4/2012 |

OTHER PUBLICATIONS

"Iterative (Turbo) Soft Interference Cancellation and Decoding for Coded CDMA" by Wang et al., 1999.
"Implementing Interference Cancellation to Increase the EV-DO Rev A Reverse Link Capacity" by Hou et al., 2006.
"HSUPA Scheduling Algorithms Utilizing RoT Measurements and Interference Cancellations" by Zhang et al., 2008.
"Low Complexity Kalman Filtering for Inter-Cell Interference and Power Based Load Estimation in the WCDMA Uplink" by Wigren, 2011.
"Recursive Noise Floor Estimation in WCDMA" by Wigren, 2010.
"Estimation of uplink WCDMA load in a single RBS" by Wigren et al., 2007.
"Soft Uplink Load Estimation in WCDMA" by Wigren, 2009.
PCT International Search Report for International application No. PCT/CN2012/075661, dated Feb. 28, 2013.
PCT Written Opinion of the International Searching Authority for International application No. PCT/CN2012/075661, dated Feb. 11, 2013.

* cited by examiner

US 9,888,446 B2

METHOD AND A FIRST NETWORK NODE FOR CONTROLLING LOAD

PRIORITY

This nonprovisional application is a U.S. National Stage Filing under 35 U.S.C. § 371 of International Patent Application Serial No. PCT/CN2012/075661, filed May 17, 2012 and entitled "A Method And A First Network Node For Controlling Load".

TECHNICAL FIELD

Embodiments herein relate to cellular radio communication systems. In particular, it is herein disclosed a first network node and a method therein for controlling load in a first cell of the first network node.

BACKGROUND

In cellular radio communication systems, it is desired to control uplink load in cells of the radio communication system in order to achieve desired coverage and stability of the cells. The uplink load is often measured in terms of power received by a radio base station of the cellular communication system.

In a known High Speed Packet Access (HSPA) system, uplink load control is managed by a Node B. In an exemplifying configuration, the Node B comprises one or more rake receivers. On the HSPA uplink, user equipments share the same time and frequency resource. Therefore, when the Node B detects a signal from a specific user equipment, the received power of other user equipments at the Node B is regarded as interference to the specific user equipment. In other words, the total received power at the Node B is regarded as a cell load. When the total received power is high, the cell load is high.

In practice, when the Node B performs uplink load control for coverage and stability, the Node B estimates a rise over thermal for coverage and a noise rise for stability to obtain measures of the cell load.

The rise over thermal (RoT) of the cell, which is the total received power over the thermal noise floor power is given by:

$$\eta = \frac{I_{tot}}{N} \quad \text{(A)}$$

The total received power, $I_{tot}$, in a cell consists of uplink power from users in the own cell, $I_{own}$, uplink Wideband Code Division Multiple Access (WCDMA) radio link power from users in the neighbour cells, $I_{nei}$, as well as the thermal noise floor power N, thus, $$I_{tot} = I_{own} + I_{nei} + N \quad \text{(B)}$$

Considering a user equipment at the cell border attempting to connect to the cell, the total received power from all of the users at the Node B is interference to this user equipment. If the interference is too high, the limited power of the user equipment may not be able to ensure a successful connection to the Node B. This results in a coverage problem. Therefore, a purpose of load control of High Speed Uplink Packet Access (HSUPA) is to control the total received power at the Node B to be below a coverage limit such that the user equipment at the cell border is able to connect to the cell when desired. The limit depends on which size, it is desired that the cell has: a lower limit for a larger cell size, and vice versa.

The noise rise for stability, λ, is determined by subtracting the neighbour cell interference contribution from $I_{tot}$. The following equation thus applies:

$$\lambda = \frac{I_{tot} - I_{nei}}{N}. \quad \text{(C)}$$

The noise rise for stability is compared to a stability limit. The reason is that if the load in the cell is too high the interference between users will cause power rushes in the system. The power rushes occurs when user equipments increase their transmit power in an uncontrolled manner. In more detail, consider a user equipment which increases its power, which then causes Signal-and-Interference-to-Noise-Ratio (SINR) of other user equipments to be reduced. These user equipments will then increase their transmit power in response to the reduced SINR. This causes SINR for all other user equipments to be further reduced. Again, all these other user equipments will increase their transmit power in response to the reduced SINR. As a result, the uncontrolled power rushes occur in situations where it is not feasible to maintain all scheduled communication resources.

Referring back to the cell load, a difference between the cell load and the limits for coverage and stability is referred to as a power headroom. See FIG. 1. The power headroom, or load headroom, is measured at an air interface of the receiver of the Node B. The Node B comprises a scheduler that aims at filling the load headroom of the air interface such that requests, from user equipments, for different bit rates are met. As stated above, the air-interface load in WCDMA is typically determined in terms of the rise over thermal for coverage and the noise rise for stability.

The scheduler performs scheduling decisions, e.g. determines uplink grants for each user equipment requesting a certain bit rate in order to perform uplink load control, referred to as an uplink load control procedure herein, as initially mentioned. In the uplink load control procedure, the scheduler distributes resources among the user equipments. When evaluating scheduling decisions, the scheduler predicts the load that results from uplink grants scheduled to the user equipments in the cell. Then, the scheduler assures that the scheduled load does not exceed the limits for coverage and stability (or load thresholds for coverage and stability).

Now consider a known Node B comprising multi-stage receiver for cancelling interference in multiple stages. A problem in relation to Node Bs comprising multi-stage receivers, such as an interference cancelling turbo receiver (Turbo-IC receiver), is then that uplink load control is not sufficiently efficient.

SUMMARY

An object is to improve uplink load control for a cell operated by a network node, such as a Node of the above mentioned kind.

According to an aspect, the object is achieved by a method in a first network node for controlling load in a first cell of the first network node. The first network node is comprised in a radio communication network. The first network node comprises a multi-stage receiver for cancelling interference in multiple stages. A first and a second radio communication device are associated with the first cell. A third radio communication device is associated with a second cell of the radio communication network. The first network node computes an interference cancellation gain, at an intermediate stage of the multi-stage receiver, during an interference cancellation process for reducing interference between uplinks signals transmitted by the first and second radio communication devices. Furthermore, the first network node estimates neighbour cell interference from interfering signals transmitted by the third radio communication device while accounting for a load utilization. The load utilization relates to power transmitted by the first and second radio communication devices and power granted to the first and second radio communication devices. Next, the first network node calculates a load measure for stability based on at least the interference cancellation gain and the neighbour cell interference. Moreover, the first network node controls the load in the first cell based on the load measure for stability.

According to another aspect, the object is achieved by a first network node configured to control load in a first cell of the first network node. The first network node is comprised in a radio communication network, wherein the first network node comprises a multi-stage receiver for cancelling interference in multiple stages. A first and a second radio communication device are associated with the first cell, wherein a third radio communication device is associated with a second cell of the radio communication network. The first network node comprises a processing circuit configured to compute an interference cancellation gain, at an intermediate stage of the multi-stage receiver, during an interference cancellation process for reducing interference between uplinks signals transmitted by the first and second radio communication devices. The processing circuit is further configured to estimate neighbour cell interference from interfering signals transmitted by the third radio communication device while accounting for a load utilization. The load utilization relates to power transmitted by the first and second radio communication devices and power granted to the first and second radio communication devices. The processing circuit is further configured to calculate a load measure for stability based on at least the interference cancellation gain and the neighbour cell interference; and to control load in the first cell based on the load measure for stability.

Thanks to that the load utilization is taken into account, a more accurate load measure is obtained. Given that the load utilization informs the first network node about how the granted resources are actually used, there will be more resources (power) available for scheduling. The requirements for the load control process are thus relaxed. Now, that the first network node has more resources (power) to schedule on, an improved throughput may be obtained. As a result, the load control in the first cell has been improved.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

In order to better appreciate advantages and benefits of the embodiments herein, some observations are presented here.

Returning to the scheduling decisions mentioned above, reference is now made to FIG. 2, in which a diagram illustrating cell throughput versus scheduled data rate.

Figure 1:
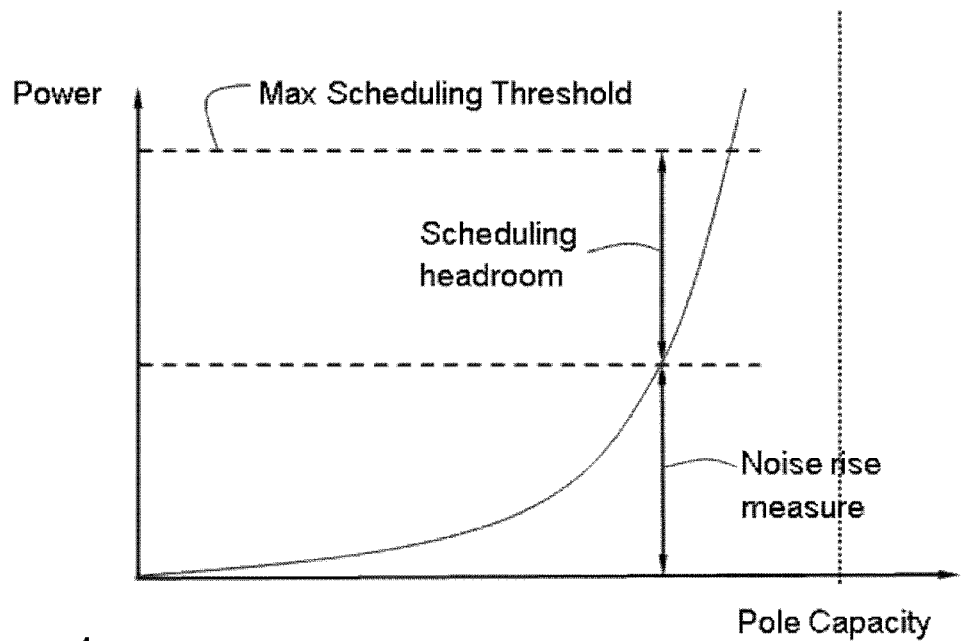
FIG. 1 is a diagram illustrating relationships between noise rise and scheduling headroom.
Figure 2:
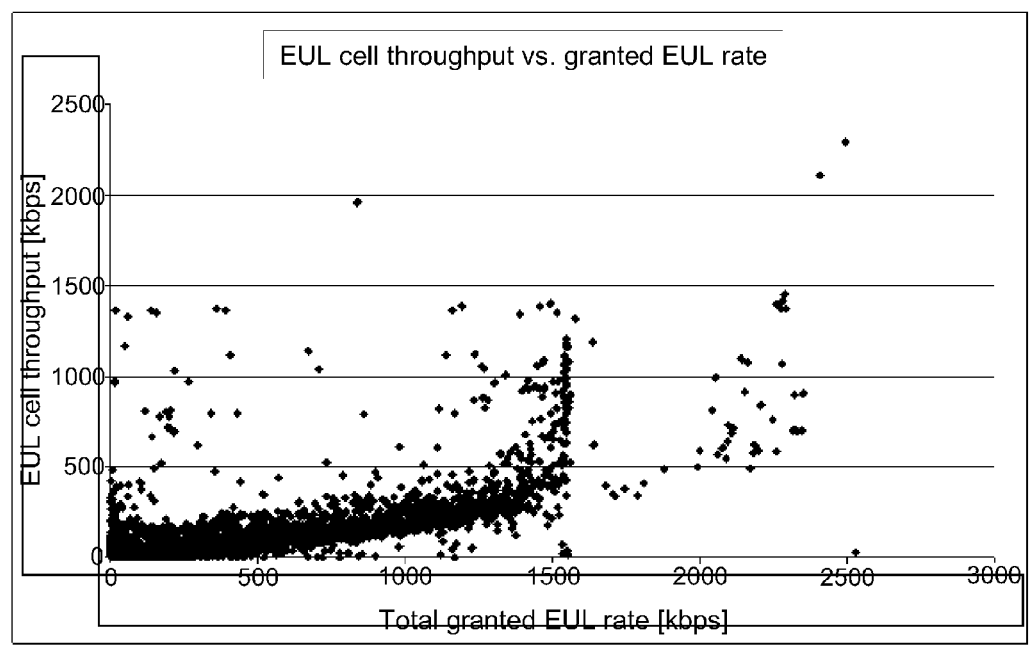
FIG. 2 is a diagram illustrating load utilization.

Again, consider a Node B comprising a multi-stage receiver and a scheduler. It is not trivial to evaluate the scheduling decisions because a scheduled uplink grant does only express a limit on the uplink (UL) power it is allowed to use, so the user equipment may use only a portion of its scheduled uplink grants. Present schedulers make a worst case analysis, assuming that the user equipments use their scheduled uplink grants at all times. Unfortunately, user equipments seem to have a relatively low utilization of grants as is illustrated in FIG. 2. The diagram of FIG. 2 indicates a uplink grant utilization of only about 25%. The uplink grant utilization relates to a ratio between scheduled uplink grants and utilized uplink grants. This ratio may be measured in terms of scheduled bit rate over actual bit rate. Evidently, there is a waste of air-interface resources.

Furthermore, for the Node B comprising the multi-stage receiver, it has been observed that there are technical and performance advantages associated with measurement of the noise rise for stability at an intermediate stage of the multi-stage receiver.

By taking into account load utilization when determining the noise rise for stability, the waste of air-interface resources may be reduced. Now, embodiments will be described in more detail.

In this context, it shall be noted that uplink load control performed by a scheduler is sometimes referred to as an outer control loop, typically at 100 to 500 Hz per loop. In contrast, an inner control loop, or inner power control loop, which may be performed at around 1500 Hz.

Throughout the following description similar reference numerals have been used to denote similar elements, network nodes, parts, items or features, when applicable. In the Figures, features that appear in some embodiments are indicated by dashed lines.

Figure 3:
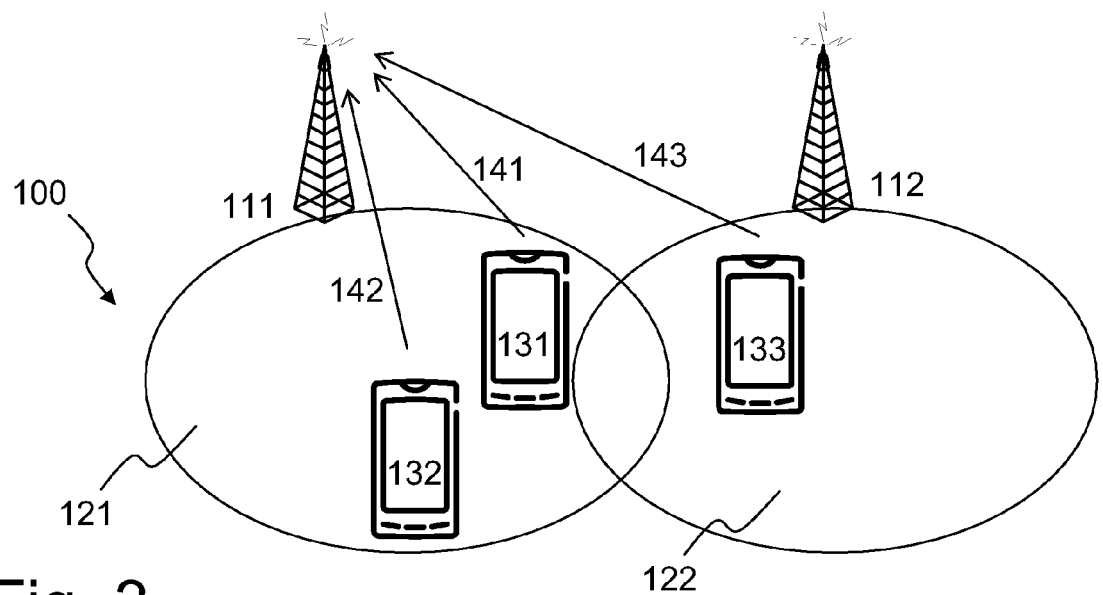
FIG. 3 is a schematic overview, illustrating an exemplifying radio communication network in which exemplifying methods according to embodiments herein may be implemented.

FIG. 3 depicts a radio communications network 100 in which embodiments herein may be implemented. The radio communications network 100 is a Code Division Multiple Access (CDMA) communication network, such as a WCDMA network.

The radio communication network 100 comprises a first network node 111. Furthermore, the radio communication network 100 may comprise a second network node 112. As used herein the expression "network node" may refer to a radio network node, a radio base station, a Node B, a radio base station controller, a radio network controller, a micro base station, a femto base station, a home NodeB or the like.

The first network node 111 operates a first cell 121. The radio communication network 100 further comprises a second cell 122. The second cell may be operated by the first network node 111 or the second network node 112. As used herein the expression "cell" may refer to a carrier, a frequency carrier, a radio frequency, an area in which user equipments may connect to the first network node 111.

A first and a second radio communication device 131, 132 are associated with the first cell 121. For example, one or more of the first and second radio communication device 131, 132 may be connected to the first cell 121. A third radio communication device 133 is associated with the second cell 122 of the radio communication network 100. As used herein, the expression "radio communication device" may be any device, mobile or stationary, enabled to communicate over a radio channel in a communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. Furthermore, the expression "radio communication device" may refer to one of two devices in a machine-to-machine communication via for example a NodeB.

The first radio communication device 131 is configured to be able to communicate 141, in at least the uplink, with the first network node 111.

The second radio communication device 132 is configured to be able to communicate 142, in at least the uplink, with the first network node 111.

Transmission from the third radio communication device 133 is interference 143 towards the first network node 111.

Figure 4:
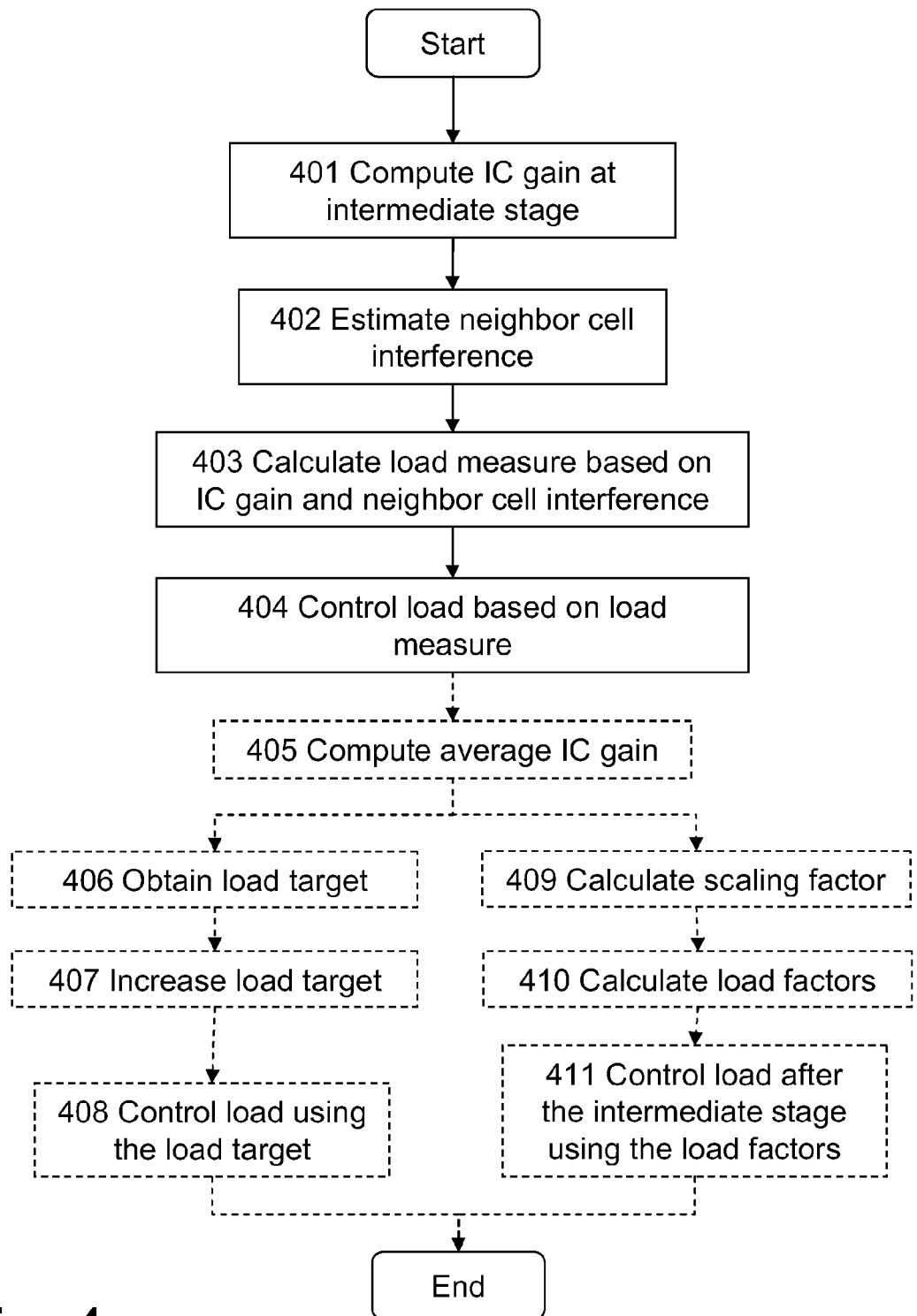
FIG. 4 is a schematic flowchart, illustrating an exemplifying method when implemented in the radio communication network of FIG. 3.

FIG. 4 shows an exemplifying, schematic flowchart, illustrating an exemplifying method according to embodiments herein, when implemented in the radio communication network 100 of FIG. 3. In particular a method in the first network node 111 for controlling load in a first cell 121 of the first network node 111 is illustrated.

As mentioned, the first network node 111 is comprised in a radio communication network 100. The first network node 111 comprises a multi-stage receiver for cancelling interference in multiple stages. The multi-stage receiver may be a Turbo-IC receiver or any other know multi-stage receiver. A known multi-stage receiver is illustrated with reference to FIG. 6. The first and second radio communication devices 131, 132 are associated with the first cell 121. The third radio communication device 133 is associated with the second cell 122 of the radio communication network 100.

The following actions may be performed. The order of the actions is merely exemplifying.

Action 401

When the first network node 111 receives signals from the first and second user equipment 131, 132, the first network node 111 starts, in particular the multi-stage receiver thereof, an interference cancellation process.

Then, the first network node 111 computes an interference cancellation gain, at an intermediate stage of the multi-stage receiver, during the interference cancellation process for reducing interference between uplinks signals transmitted by the first and second radio communication devices 131, 132. This means that the interference cancellation process, which may be an iterative process, need not be completed when the interference cancellation gain is computed. The interference cancellation process shall however have been started. In some examples, the intermediate stage may in fact be the last stage of the multi-stage receiver. However, time spend on calculating the interference cancellation gain will then increase as compared to when the interference cancellation gain is computed at an earlier intermediate stage of the multi-stage receiver.

The computed interference cancellation gain may comprise an instantaneous interference cancellation gain for a current transmission time interval. The instantaneous interference cancellation gain may be cell-specific or channel-specific.

Action 402

The first network node 111 estimates neighbour cell interference from interfering signals transmitted by the third radio communication device 133 while accounting for a load utilization. The load utilization relates to power transmitted by the first and second radio communication devices 131, 132 and power granted to the first and second radio communication devices 131, 132. The load utilization and the neighbour cell interference may be computed jointly. An exemplifying method for estimation of neighbour cell interference is described in section "joint estimation of neighbour cell interference and load utilization".

Thanks to that load utilization is accounted for, waste of radio resources may be reduced as mentioned above.

Action 403

The first network node 111 calculates a load measure for stability based on at least the interference cancellation gain and the neighbour cell interference. The load measure for stability may further be based on thermal noise floor and total effective interference in the first cell 121. The total effective interference is given by reducing the total interference at the air interface with the IC gain. The load measure may comprise noise rise for stability.

Action 404

The first network node 111 controls the load in the first cell 121 based on the load measure for stability.

Action 405

The first network node 111 may compute an average interference cancellation gain over a number of transmission time intervals. The average interference cancellation gain is determined based on a respective difference between a respective power measure for stability at an air interface of the multi-stage receiver and a respective power measure for stability after the intermediate stage of the multi-stage receiver for each respective transmission time interval of the number of transmission time intervals.

Action 406

According to a first set of embodiments, the load control of action 404 is performed before the interference cancellation. In these embodiments, the first network node 111 obtains a load target for stability, or a load threshold for stability. When the load measure exceeds the load target for stability, power rushes may occur. This is clearly not desired. Therefore, the first network node 111 attempts to control load in the first cell such that the load measure is less than the load target for stability.

Action 407

Then following action 406, the first network node 111 may increase the load target for stability based to the computed interference cancellation gain. As an example, an increased load target for stability may be equal to the sum of the interference cancellation gain, expressed in dB, and the obtained load target.

Action 408

According to the first set of embodiments, the action 404 of controlling load may be that the first network node 111 controls the load of the first cell 121 at an air interface of the multi-stage receiver while using the increased load target and the load measure.

Action 409

According to a second set of embodiments, the load control of action 404 is performed at, or after, an intermediate stage of interference cancellation. In these embodiments, the first network node 111 determines a scaling factor based on the computed interference cancellation gain and the load measure.

Action 410

Following action 409, the first network node 111 may calculate load factors based on the scaling factor.

Action 411

According to the second set of embodiments, the action 404 of controlling load may be that the first network node 111 controls the load of the first cell 121 after the intermediate stage of the multi-stage receiver while using the determined load factors.

It is preferred that either the first set of embodiments or the second set of embodiments is performed since both the first and second sets of embodiments present manners in which the load control may be adapted due to the multi-stage receiver in the first radio network node.

For completeness, it is here disclosed first how rise over thermal for coverage may be calculated. Next, it is disclosed how noise rise for stability may be calculated. By first describing rise over thermal for coverage and then noise rise for stability, it is intended to facilitate understanding.

Returning to equations (A) and (B), which now will be repeated as equation (1) and (2), the rise over thermal, η, is given by:

$$\eta = \frac{I_{tot}}{N} \quad (1)$$

The total received power, $I_{tot}$, in a cell consists of uplink power from users in the own cell, $I_{own}$, uplink WCDMA radio link power from users in the neighbor cells, $I_{nei}$, as well as the thermal noise floor power N, thus, $$I_{tot} = I_{own} + I_{nei} + N \quad (2)$$

In order to control the total load in the cell to be below the RoT target, the load estimator needs to estimate the load generated by each radio connection and the available scheduling headroom that the EDCH traffic can use.

The load factor of one radio connection is defined as $$L_i = P_i/I_{tot} \quad (3)$$

where $P_i$ is the received signal power from user channel i. The load factor estimation is the basis for load control. Therefore, for example the DPCCH load of user i is $L_{ci} = P_{ci}/I_{tot}$ where $P_{ci}$ is the received DPCCH power of user i, The scheduling headroom, or the maximum allowed E-DCH load in the cell is thus $$L_{max\ EDCH} = L_{max\ RoT} - L_{others} - L_{nonEDCH} = 1 - 1/RoT_{target} - L_{others} - L_{nonEDCH} \quad (4)$$

Where $L_{others}$ is the summed load of the inter-cell interference and $L_{nonEDCH}$ is the summed load of the non-EDCH channels, for example DCH and HS-DPCCH of non-EDCH users.

$$L_{nonEDCH} = \sum_{\#nonEDCH} P_{nonEDCH}/I_{tot} \quad (5)$$

During scheduling, the scheduler can estimate the total enhanced dedicated channel (E-DCH) load with the allocated grant by summing the load factor of the E-DCH channels.

$$L_{EDCH} = \sum_{\#EDCH} P_{EDCH}/I_{tot} \quad (6)$$

The scheduler can also estimate the enhanced transport format combination (E-TFC) grant that can consume the available load head room based on the E-DPDCH load factor.

The E-DPDCH load factor of user i with E-TFC j is $L_{E-TFCj,i} = P_{E-TFCj,i}/I_{tot} = P_{ci} \cdot \beta_j/I_{tot}$ where $\beta_j$ is the E-DPDCH to DPCCH power offset and is one by one mapped with E-TFCj.

Therefore, suppose the available load head room for user i is $L_{avail}$, the suitable E-TFC (or corresponding power offset) can be calculated as $$\beta_j = L_{avail}/(P_{ci}/I_{tot}) \quad (7)$$

Reference (7) is usually denoted the load to E-TFC mapping. When addressing load stability, existing solutions suggests a subtraction of the neighbor cell interference contribution from $I_{tot}$, rendering the following load measure relevant for stability $$\lambda = \frac{I_{tot} - I_{nei}}{N}. \quad (8)$$

This corresponds to equation (C) in the background section.

Conceptually simple, it is however difficult to come up with a way to estimate the neighbor cell interference, thereby making (8) feasible. The noise rise target for stability is then $$\lambda_{target} = \frac{I_{tot,target} - I_{nei}}{N} \quad (9)$$

Correspondingly, the load factor for stability is defined as $$L^{sta}_i = P_i/(I_{tot} - I_{nei}) \quad (10)$$

The scheduling headroom from a stability point of view, is thus $$L^{sta}_{maxEDCH} = \quad (11)$$
$$1 - 1/\lambda_{target} - L^{sta}_{nonEDCH} = 1 - \frac{N}{I_{tot,target} - I_{nei}} - \frac{P_{nonEDCH}}{I_{tot,target} - I_{nei}} =$$
$$\frac{I_{tot,target} - I_{nei} - N - P_{nonEDCH}}{I_{tot,target} - I_{nei}}$$

The load to E-TFC mapping from the stability point of view is thus $$\beta^{sta}_j = L^{sta}_{avail}/(P_{ci}/(I_{tot} - I_{nei})) \quad (12)$$

Where the available load room for user i from stability point of view is $L^{sta}_{avail}$, and $\beta^{sta}_j$ is the suitable E-TFC or corresponding power offset for this E-TFCj.

Thermal Noise Power Estimation

The estimation of RoT, and the noise rise relevant for stability, rely on the measurement of the total interference and knowledge of the thermal noise power floor.

To understand the need to apply sophisticated estimation techniques to find the thermal noise power floor note first that the signal reference point is, by definition at the antenna connector. The interference measurements are however obtained after the analogue signal conditioning chain, in the digital receiver. The analogue signal conditioning chain does introduce a scale factor error of about 1 dB (1-sigma) that is difficult to compensate for. Fortunately, all contributing interference powers are equally affected by the scale factor error so when the RoT is calculated, the scale factor error is cancelled as $$RoT_{Digitalreceiver} = \frac{I_{tot,air}}{N_{Digitalreceiver}} = \frac{scaleFactor \times I_{tot,antenna}}{scaleFactor \times N_{Antenna}} = RoT_{Antenna}. \quad (13)$$

In order to understand the fundamental problem of neighbor cell interference when performing load estimation, note that $$I_{nei} + N = E[I_{nei}(t)] + E[N] + \Delta I_{nei} + \Delta N, \quad (14)$$

where E[ ] denotes mathematical expectation and where Δ denotes the variation around the mean. The fundamental problem can now be clearly seen. Since there are no measurements available in the RBS that are related to the neighbor cell interference, a linear filtering operation can at best estimate the sum $E[I_{nei}]+E[N]$. This estimate cannot be used to deduce the value of E[N]. The situation is the same as when the sum of two numbers is available. Then there is no way to figure out the values of the individual numbers. This issue is analyzed rigorously for the RoT estimation problem in T. Wigren "Soft uplink load estimation in WCDMA", IEEE Trans Veh. Tech., March 2009, in which it is proved that the noise power floor is not mathematically observable.

Air Interface RoT for Coverage and Effective RoT after Interference Cancellation Assume that there are several users, all transmitting on Dedicated Physical Control Channel (DPCCH) and Enhanced Dedicated Physical Data Channel (E-DPDCH). Assume for the sake of simplicity that the received power due to the Enhanced Dedicated Physical Control Channel (E-DPCCH) is negligible.

Let $P_{ci}$ and $P_{di}$ be the received DPCCH and E-DPDCH powers for the i-th user, respectively. Let $I_{nei}$ and N represent the received other-cell interference power, also referred to as neighbour cell interference power, and thermal noise power, respectively.

Let $\epsilon_{ci}$ and $\epsilon_{di}$ be the residual interference fractions (RIF) after IC for the DPCCH and E-DPDCH of the i-th user, respectively. The $\epsilon_{ci}$ and $\epsilon_{di}$ are relevant for coverage gains, i.e. for RoT. The RIF is defined to be $$\varepsilon_i = 1 - \eta_i \quad (15)$$

where $$\eta_i = 1 - \frac{P_{residual}}{P} \quad (16)$$

is the cancellation efficiency. P is the power of a particular signal before cancellation and $P_{residual}$ is the residual power after cancellation.

Note that the RIF depends on the IC stage, or in other words, for each antenna buffer after each IC stage the RIF for each channel could be different.

Before interference cancellation, the total received power is $$I_{total,air} = \Sigma(P_{ci}+P_{di}) + I_{nei} + N \quad (17)$$

and the associated RoT at the air interface is $$RoT_{air} = \frac{I_{total,air}}{N} \quad (18)$$

After the IC, the total residual signal power in the antenna buffer is $$I_{total,eff} = \Sigma(\epsilon_{ci}P_{ci}+\epsilon_{di}P_{di}) + I_{nei} + N \quad (19)$$

Note that $\epsilon_{ci}$ or $\epsilon_{di}$ could be unity which means that user or channel is not cancelled in the IC process.

The associated (effective) RoT is $$RoT_{eff} = \frac{I_{total,eff}}{N} \quad (20)$$

Note that the total residual signal power $I_{total,eff}$ depends on the IC stage too. Theoretically, the total residual signal power after the final IC stage should be smaller than the total residual signal power after the first IC stage.

Further, define a cell-wide cancellation efficiency to be $$\eta_{cell} = 1 - \frac{I_{total,eff}}{I_{total,air}} = 1 - \frac{RoT_{eff}}{RoT_{air}} \quad (21)$$

Hence the cell-wide IC gain is given by $$G_{cell,IC} = 10\log_{10}\frac{RoT_{air}}{RoT_{eff}} \quad (22)$$

This quantity reflects how much own-cell interference is cancelled in the IC aggregated over all users.

Air Interface Noise Rise for Stability and Effective Noise Rise for Stability after IC This section relates to action 403. Before interference cancellation (IC), the total received power relevant for stability is $$I_{total,air} - I_{nei} = \Sigma(P_{ci}+P_{di}) + N \quad (23)$$

and the associated noise rise relevant for cell stability at the air interface is $$\lambda_{air} = \frac{I_{total,air} - I_{nei}}{N} \quad (24)$$

After IC, the total residual signal power in the antenna buffer, relevant for cell stability is $$I_{total,eff} - I_{nei} = \Sigma(\epsilon_{ci}P_{ci}+\epsilon_{di}P_{di}) \pm N \quad (25)$$

The above equation follows since IC does only affect the signal of users of the own cell that are demodulated, detected, and decoded. Please note that $\epsilon_{ci}$ or $\epsilon_{di}$ could be unity which meaning that user or channel is not cancelled in the IC process.

The associated (effective) noise rise for stability is $$\lambda_{eff} = \frac{I_{total,eff} - I_{nei}}{N} \quad (26)$$

Note that the total residual signal power $I_{total,eff}$ depends on the IC stage too. Theoretically, the total residual signal power after the final IC stage should be smaller than the total residual signal power after the first IC stage.

Further, define a cell-wide cancellation efficiency, relevant for cell stability, as $$\gamma_{cell} = 1 - \frac{I_{total,eff} - I_{nei}}{I_{total,air} - I_{nei}} = 1 - \frac{\lambda_{eff}}{\lambda_{air}} \quad (27)$$

Hence the cell-wide IC gain relevant for stability is given by $$G_{cell,stability,IC} = 10\log_{10}\frac{\lambda_{air}}{\lambda_{eff}} \quad (1)(1)(28)$$

This quantity reflects how much own-cell interference is cancelled in the IC aggregated over all users, when neighbor cell interference is subtracted.

Joint Neighbor Cell Interference and Load Utilization Estimation—General Consideration This section relates to action 403. As should be evident above, the neighbor cell interference is not affected by interference cancellation; hence it can be estimated directly from air interface quantities. The scope of this section is to disclose an estimation algorithm capable of performing a joint estimation of $I_{total,air}(t)$, $I_{other}(t)+N(t)$, $N(t)$, $I_{other}(t)$ and the load utilization probability $p_{load}(t)$. As it turns out, an extended Kalman filter (EKF) is a suitable algorithm for this task, although other approaches exist as well. The following sections hence describe one particular embodiment suitable for this task.

Available Information

The estimation algorithm will use the following information

Measurements of $I_{total}(t)$, with a sampling rate of $T_{total}=k_{total}TTI$, $k\in Z+$.

Computed load factors $L_{own}(t)$, with a sampling rate of $T_L=k_L TTI$, $k_L\in Z+$. Here $L_{own}(t)$ is the sum of the scheduled load factors of all channels in the own cell, capturing both R99 and EUL traffic.

The loop delay $T_D$ between the calculation of $L_{own}(t)$, and the time it takes effect on the air interface. The loop delay is dependent on the TTI.

States

The states are selected as $$x_1(t)=p_{load}(t) \quad (29)$$

$$x_2(t)=I_{other}(t)+N(t). \quad (30)$$

Measurement Model

The measured signal that is available for processing is $I_{total}(t)$. The load of the own cell $L_{own}(t)$ is a computed quantity, for this reason a measurement model of $I_{total}(t)$ is needed, expressed in terms of the states, computed quantities and a measurement uncertainty.

To model the load utilization effect, standard consideration suggests that load underutilization can be modeled by $$L_{own,utilized}(t)=p_{load}(t)L_{own}(t-T_D) \quad (31)$$

$$I_{total}(t)L_{own,utilized}(t)I_{total}(t)+I_{other}(t)+N(t) \quad (32)$$

which results in $$I_{total}(t) = \frac{1}{1 - L_{own}(t - T_D)p_{load}(t)}(I_{other}(t) + N(t)). \quad (33)$$

After addition of a zero mean white measurement noise $e_{total}(t)$ and replacement of variables by the states of (29) and (30), the following nonlinear measurement equation results $$y_{total}(t) = \frac{x_2(t)}{1 - L_{own}(t - T_D)x_1(t)} + e_{total}(t) \quad (34)$$

$$R_{2,total}(t) = E[e_{total}^2(t)]. \quad (35)$$

Here $y_{total}(t)=I_{total}(t)$ and $R_{2,total}(t)$ denotes the (scalar) covariance matrix of $e_{total}(t)$.

Note: The load of the own cell is computed both using both EUL and R99 traffic, hence in this case the delay is valid for both.

Dynamic State Model

In order to set up an optimal filtering algorithm, it is necessary to write down a model for propagation of the states. Since the two involved quantities are both positive quantities, it follows that any dynamic model needs to have integrating modes corresponding states, in order to allow dynamic variations around a nonzero positive mean value. Here this is solved by postulating the most simple such model, namely the random walk.

The random walk model corresponding to the states of (29) and (30) becomes $$x(t + T_{TTI}) \equiv \begin{pmatrix} x_1(t + T_{TTI}) \\ x_2(t + T_{TTI}) \end{pmatrix} = \begin{pmatrix} 1 & 0 \\ 0 & 1 \end{pmatrix}\begin{pmatrix} x_1(t) \\ x_2(t) \end{pmatrix} = \begin{pmatrix} w_1(t) \\ w_2(t) \end{pmatrix} \quad (36)$$

$$R_1(t) = E\left[\begin{pmatrix} w_1(t) \\ w_2(t) \end{pmatrix}(w_1(t) \; w_2(t))\right]. \quad (37)$$

Here $R_1(t)$ denotes the covariance matrix of the zero mean white disturbance $(w_1(t) \; w_2(t))^T$. $T_{TTI}$ denotes the sampling time of the transmission time interval (2 ms or 10 ms).

The General Extended Kalman Filter

The state space model behind the extended Kalman filter (EKF) is $$x(t+T)=A(t)x(t)+B(t)u(t)+w(t). \quad (38)$$

$$y(t)=c(x(t))+e(t). \quad (39)$$

Here x(t) is the state vector, u(t) is an input vector that is not used here, y(t) is an output measurement vector consisting of the power measurements performed in the cell i.e. the total received wideband power, $I_{total}$), w(t) is the so called systems noise that represent the model error, and e(t) denotes the measurement error. The matrix A(t) is the system matrix describing the dynamic modes, the matrix B(t) is the input gain matrix, while the vector c(x(t)) is the possibly nonlinear, measurement vector which is a function of the states of the system. Finally t represents the time and T represents the sampling period.

The general case with a nonlinear measurement vector is considered here. For this reason the extended Kalman filter needs to be applied. This filter is given by the following matrix and vector iterations, Initialization (40)

$t = t_0$ $\hat{x}(0|-1) = x_0$ $P(0|-1) = P_0$

Iteration $t = t + T$ $C(t) = \left.\dfrac{\partial c(x)}{\partial x}\right|_{x=\hat{x}(t|t-T)}$ $K_f(t) = P(t|t-T)C^T(t)(C(t)P(t|t-T)C^T(t) + R_2(t))^{-1}$ $\hat{x}(t|t) = \hat{x}(t|t-T) + K_f(t)(y(t) - c(\hat{x}(t|t-T)))$ $P(t|t) = P(t|t-T) - K_f(t)C(t)P(t|t-T)$ $\hat{x}(t+T|t) = A\hat{x}(t|t) + Bu(t)$ $P(t+T|t) = AP(t|t)A^T + R_1.$ End The quantities introduced by the filter iterations (40) are as follows. $\hat{x}(t|t-T)$ denotes the state prediction, based on data up to time $t-T$, $\hat{x}(t|t)$ denotes the filter update, based on data up to time $t$, $P(t|t-T)$ denotes the covariance matrix of the state prediction, based on data up to time $t-T$, and $P(t|t)$ denotes the covariance matrix of the filter update, based on data up to time $t$. $C(t)$ denotes the linearized measurement matrix (linearization around the most current state prediction), $K_f(t)$ denotes the time variable Kalman gain matrix, $R_2(t)$ denotes the measurement covariance matrix, and $R_1(t)$ denotes the system noise covariance matrix. It can be noted that $R_1(t)$ and $R_2(t)$ are often used as tuning variables of the filter. In principle the bandwidth of the filter is controlled by the matrix quotient of $R_1(t)$ and $R_2(t)$.

Load Utilization Estimation with the EKF

The quantities of the EKF for estimation of load utilization can now be defined. The initial value setting is discussed in the simulation section following below.

Using (29)-(37) and (40), it follows that $C_1(t) =$ (41)

$\left(\dfrac{L_{own}(t-T_D)\hat{x}_2(t|t-T_{TTI})}{(1-L_{own}(t-T_D)\hat{x}_1(t|t-T_{TTI}))^2} \quad \dfrac{1}{1-L_{own}(t-T_D)\hat{x}_1(t|t-T_{TTI})}\right) =$ $(C_1(t) \quad C_2(t))$ $R_2(t) = R_{2,total}(t) = E[e_{total}^2(t)]$ (42)

$c(\hat{x}(t|t-T_{TTI})) = \dfrac{\hat{x}_2(t|t-T_{TTI})}{1-L_{own}(t-T_D)\hat{x}_1(t|t-T_{TTI})}$ (43)

$A = \begin{pmatrix} 1 & 0 \\ 0 & 1 \end{pmatrix}$ (44)

$B = 0$ (45)

$R_1(t) = E\left[\begin{pmatrix} w_1(t) \\ w_2(t) \end{pmatrix}(w_1(t) \quad w_2(t))\right].$ (46)

In order to write down the EKF, denote the state prediction and the state covariance prediction at time t by $x(t|t-T_{TTI}) = \begin{pmatrix} x_1(t|t-T_{TTI}) \\ x_2(t|t-T_{TTI}) \end{pmatrix}$ (47)

$P(t|t-T_{TTI}) = \begin{pmatrix} P_{11}(t-T_{TTI}) & P_{12}(t-T_{TTI}) \\ P_{12}(t-T_{TTI}) & P_{22}(t-T_{TTI}) \end{pmatrix}.$ (48)

With these definitions the scalar equations of the extended Kalman filter iteration become, cf. (40)

Iteration (49)

$t = t + T$ $c(\hat{x}(t|t-T_{TTI})) = \dfrac{\hat{x}_2(t|t-T_{TTI})}{1-L_{own}(t-T_D)\hat{x}_1(t|t-T_{TTI})}$ $C_1(t) = \dfrac{L_{own}(t-T_D)\hat{x}_2(t|t-T_{TTI})}{(1-L_{own}(t-T_D)\hat{x}_1(t|t-T_{TTI}))^2}$ $C_2(t) = \dfrac{1}{1-L_{own}(t-T_D)\hat{x}_1(t|t-T_{TTI})}$ $K_{f,1}(t) \dfrac{C_1(t)P_{11}(t|t-T_{TTI}) + C_2(t)P_{12}(t|t-T_{TTI})}{C_1^2(t)P_{11}(t|t-T_{TTI}) +}$ $2C_1(t)C_2(t)P_{12}(t|t-T_{TTI}) + C_2^2(t)P_{22}(t|t-T_{TTI})$ $K_{f,2}(t) \dfrac{C_1(t)P_{12}(t|t-T_{TTI}) + C_2(t)P_{22}(t|t-T_{TTI})}{C_1^2(t)P_{11}(t|t-T_{TTI}) +}$ $2C_1(t)C_2(t)P_{12}(t|t-T_{TTI}) + C_2^2(t)P_{22}(t|t-T_{TTI})$ $\hat{x}_1(t|t) = \hat{x}_1(t|t-T) + K_{f,1}(t)(y_{total}(t) - c(\hat{x}(t|t-T)))$ $\hat{x}_2(t|t) = \hat{x}_2(t|t-T) + K_{f,2}(t)(y_{total}(t) - c(\hat{x}(t|t-T)))$ $P_{11}(t|t) = P_{11}(t|t-T_{TTI}) -$ $K_{f,1}(C_1(t)P_{11}(t|t-T_{TTI}) + C_2(t)P_{22}(t|t-T_{TTI}))$ $P_{12}(t|t) = P_{12}(t|t-T_{TTI}) -$ $K_{f,1}(C_1(t)P_{12}(t|t-T_{TTI}) + C_2(t)P_{22}(t|t-T_{TTI}))$ $P_{22}(t|t) = P_{22}(t|t-T_{TTI}) -$ $K_{f,2}(C_1(t)P_{12}(t|t-T_{TTI}) + C_2(t)P_{22}(t|t-T_{TTI}))$ $\hat{x}_1(t+T_{TTI}|t) = \hat{x}_1(t|t)$ $\hat{x}_2(t+T_{TTI}|t) = \hat{x}_2(t|t)$ $P_{11}(t+T_{TTI}|t) = P_{11}(t|t) + R_{1,11}(t)$ $P_{12}(t+T_{TTI}|t) = P_{12}(t|t) + R_{1,12}(t)$ $P_{22}(t+T_{TTI}|t) = P_{22}(t|t) + R_{1,22}(t)$ End.

It is stressed that the estimated variance of the sum of neighbor cell interference and thermal noise power floor is available in $P_{22}$ (t|t). Together with the estimate of the variance of the thermal noise power floor, $\sigma_N^2$ (t|t), estimated, standard considerations show that the variance of the neighbor cell interference estimate can be estimated as $\sigma_{neighbor}^2(t|t) = \sigma_N^2(t|t) + P_{22}(t|t).$ (50)

Load Utilization Probability Estimation and Power Normalization

In document T. Wigren, "Recursive noise floor estimation in WCDMA", IEEE Trans Veh. Tech, vol. 59, no 5, pp. 2615-2620, 2010, a problem is recognized. The problem is associated with power scaling of the Kalman filter of the RoT estimator. Essentially the problem is due to the fact that the Kalman filter is designed at a specific operating point in the linear power domain. Now, with recent traffic increases, this is no longer true. The document therefore introduces power normalization based on the following result Result 1:

Assume that the following assumptions A1)-A4) hold,
A1) The eigenvalues $\lambda$ of A fulfil $|\lambda| \leq 1$, i.e. the power model is stable.
A2) Nonlinear load coupling between the power control loops are neglected.
A3) e(t) is a Gaussian zero mean disturbance that fulfils $E[e(t)e^T(s)] = \delta_{t,s} R_2(t)$.
A4) $w(t) = (w_1(t) \; w_2^{power}(t))^T$ is a Gaussian zero mean disturbance that fulfils $E[w(t)w^T(s)] = \delta_{t,s} R(t)$ Assume further that solutions $\hat{x}(t|t-T), \hat{x}(t|t), P(t|t-T), P(t|t)$ are computed from (40) for $t > t_0$ using initial values $\hat{x}_0 (t_0|t_0-T)$ and $P_0(t_0|t_0-T)$. Then, if (40) is rerun from $\hat{x}_0 (t_0|t_0-T)$ and $P_0(t_0|t_0-T)$ using the scaled covariance matrices $R_1^v(t) = v^2(t)R_1(t)$ and $R_2^v(t) = v^2(t)R_2(t)$, the following results holds:

$$\hat{x}^v(t|t-T) = \hat{x}(t|t-T), t > t_0$$

$$\hat{x}^v(t|t) = \hat{x}(t|t), t > t_0$$

$$P^v(t|t-T) = v^2(t)P(t|t-T), t > t_0$$

$$P^v(t|t) = v^2(t)P(t|t), t > t_0$$

where the superscript $( )^v$ denotes the reiterated variables.

Again as shown in document T. Wigren, "Recursive noise floor estimation in WCDMA", IEEE Trans Veh. Tech, vol. 59, no 5, pp. 2615-2620, 2010, the achieved scaling of the covariances is exactly what is needed in order to make the estimated covariances scale with the average power level, thereby adapting to the logarithmic discretization of power in the noise floor estimators of the document initially mentioned.

It should be noted that simplified versions are also possible, where only the variance of the signal sent on for noise floor estimation is scaled.

The result is valid when the state covariance matrices are identically scaled. Hence, also the utilization probability will have to be scaled using this technology in the present algorithms.

Load Control for Interference Before Interference Calculation: Adaptive Cell-Specific Air Interface Noise Rise Target for Cell Stability In the first disclosed method, the load control is still based on the received signals in the antenna buffer before IC. The load control target is still set for the air-interface noise rise relevant for cell stability. But considering the IC benefit, the air interface noise rise target for cell stability can be increased.

Suppose the air interface noise rise target without IC to be $\lambda_{target\_withoutIC}$, and then the air interface target can be increased to $\lambda_{target\_air\_IC}$ when there is IC deployed in the cell, $$(\lambda_{target\_air\_IC})_{dB} = (\lambda_{target\_withoutIC})_{dB} + G_{cell,stability,IC} \quad (51)$$

where $G_{cell,stability,IC}$ is the IC gain relevant for cell stability. This quantity can be estimated in several ways, In a first embodiment (Embodiment 1), an instantaneous interference cancellation gain is utilized.

In this embodiment, the IC gain can be estimated according to (28), but the effective noise rise in (28) is the effective noise rise measured after the intermediate IC stage rather than the final IC stage.

In a second embodiment (Embodiment 2), statistical interference cancellation gain via a self-learning procedure is utilized.

In this embodiment, an adaptive learning algorithm is used to estimate the IC gain.

Step 1, the instantaneously IC gain after the $1^{st}$ IC stage is measured.

Step 2, do this over a long time period and over many users to build up a CDF of IC gain.

Step 3, extract some percentile from the generated CDF, e.g., in 90 percent of cases, the statistical IC gain is x dB Step 4, the air interface noise rise target for stability is updated according to (51) and the IC gain is xdB.

Load Control for Interference after the Intermediate Stage of IC: Effective Noise Rise Relevant for Cell Stability In this method, the load control function is moved from the antenna buffer before IC to the antenna buffer after the 1st IC stage. This means that instead of the air interface noise rise for stability, the effective noise rise for stability after the 1st IC stage is controlled to be below a target.

Effective Noise Rise Relevant for Stability Target after the Intermediate IC Stage The target of the effective noise rise relevant for stability should be set the same as the normal air interface noise rise target relevant for cell stability when without IC. For example, if the noise rise target relevant for cell stability for a cell is 10 dB in the normal case, when IC is deployed, in order to keep the stability, the target of the effective noise rise relevant for cell stability after the 1st IC stage should also be set to 10 dB.

Load Factors after the Intermediate IC Stage

As described above, in order to calculate the allowed scheduling headroom, and further on to estimate the grant E-TFC, the load factor for each channel needs to be calculated.

After the intermediate IC stage (for example the first IC stage), the DPCCH load factor for stability is $$L_{ci}^{sta} = \varepsilon_{IC} \frac{P_{ci}}{I_{total,eff} - I_{nei}} \quad (52)$$

where $\epsilon_{IC} = 10^{-G_{cell,stability,IC}/10}$ is a scaling factor that can be estimated in different ways.

In a first solution (Solution 1), a load factor scaling with statistical IC gain is utilized.

With this solution, $\epsilon_{IC}$ is estimated by statistical methods described by section "load-to-ETFCI mapping" in embodiment 2.

Either the average IC gain or some percentile of the IC gain CDF can be used.

In a second solution (Solution 2), load factor scaling with instantaneous IC gain is utilized.

Solution 2.1: cell-level instantaneous IC gain as in (28)
Solution 2.2: channel specific IC gain
DPCCH Load Factor for Stability:

$$L_{ci}^{sta} = \frac{\varepsilon_{ci} P_{ci}}{I_{total,eff} - I_{nei}} \quad (53)$$

where $\epsilon_{ci}$ is the residual interference fractions (RIF) after IC for the DPCCH of the i-th user.

E-DPDCH Load Factor for Stability of the MUD Users:

$$L_{di,MUD}^{sta} = \frac{\varepsilon_{di,MUD} P_{di,MUD}}{I_{total,eff} - I_{nei}} = \frac{\varepsilon_{di,MUD} \beta_{di,MUD} P_{ci,MUD}}{I_{total,eff} - I_{nei}} \quad (54)$$

where $\epsilon_{di,MUD}$ is the residual interference fractions (RIF) after IC for the E-DPDCH of the i-th user (MUD user) and $\beta_{di,MUD}$ is the E-DPDCH to DPCCH power offset for the i-th user.

E-DPDCH Load Factor for Stability of the Non-MUD Users $$L_{di,nonMUD}^{sta} = \frac{P_{di,nonMUD}}{I_{total,eff} - I_{nei}} = \frac{\beta_{di,nonMUD} P_{ci,nonMUD}}{I_{total,eff} - I_{nei}} \quad (55)$$

Notice that the load factor is not scaled by the RIF since the E-DPDCH signal for non MUD user is not cancelled in the first stage of IC.

The estimated load factors are the basis for the load to E-TFC mapping in the scheduler to estimate the grant E-TFC.

Load-to-ETFCI Mapping

In the load-to-EFTCI mapping process the scheduler measures the DPCCH load and predicts the E-DPDCH load from this. The goal is to choose the power offset to fill up the available load headroom. Today, without IC, this prediction is done simply by multiplying the DPCCH load by the power offset to obtain the E-DPDCH load. Please note that here the load to E-TFC mapping is done from the stability point of view $$\beta_{di}^{sta} = \frac{Load_{avail}^{sta}}{L_{ci}^{sta}} \quad (56)$$

However, with IC, if we express the E-DPDCH load factor in terms of the DPCCH load factor for the MUD users we get $$L_{di,MUD}^{sta} = \beta_{di,MUD}^{sta} \left( \frac{\varepsilon_{di,MUD}}{\varepsilon_{ci,MUD}} \right) L_{ci,MUD}^{sta} \quad (57)$$

For the non-MUD user we get $$L_{di,nonMUD}^{sta} = \beta_{di,nonMUD}^{sta} \left( \frac{1}{\varepsilon_{ci,nonMUD}} \right) L_{ci,nonMUD}^{sta} \quad (58)$$

One can see from (57) and (58) that the E-DPDCH load depends not only on the DPCCH load and power offset, but also on the RIF factors.

Therefore, the power offset can be estimated by $$\beta_{di}^{sta} = \frac{Load_{avail}^{sta}}{L_{ci}^{sta}} \left( \frac{\varepsilon_{ci}}{\varepsilon_{di}} \right) \quad (59)$$

For MUD users, for simplicity, one could ignore the fact that the E-DPDCH and DPCCH RIF factors might be different and use the conventional mapping approach as (56). However, in practice, one would expect the RIF factors to be different for at least at two reasons:

Typically the DPCCH is cancelled in the first stage and the E-DPDCH undergoes multiple stages of cancellation.

The DPCCH is cancelled based on hard decisions on the DPCCH data. In contrast, the E-DPDCH is cancelled based on soft symbol values that reflect the quality of the decoded E-DPDCH bits.

In contrast to the MUD users, the non-MUD users' E-DPDCHs are not cancelled in the first stage. One cannot assume that the E-DPDCH and DPCCH RIF factors are same. Therefore, for non-MUD users, the power offset can be estimated as:

$$\beta_{di,nonMUD}^{sta} = \frac{Load_{avail}^{sta}}{L_{ci,nonMUD}^{sta}} \varepsilon_{ci,nonMUD} \quad (60)$$

Besides channel specific RIF $\epsilon_{ci,nonMUD}$, we can also use the instantaneous cell specific scaling factor (28) as described in section "air interface noise rise for stability and effective noise rise for stability after IC" or some average measure of cell-wide IC gain obtained from the distribution (CDF) of $G_{cell,stability,IC}$.

To conclude, four load control/load estimation alternatives are proposed.

Firstly, the interference cancellation gain is captured by increasing the air interface noise rise target for stability by x dB where x is determined by capturing a long term statistics on the difference between the air interface noise rise for stability and the noise rise for stability after at least one stage of IC.

Secondly, the IC gain is captured by increasing the air interface noise rise target for stability target by x dB where x is determined by capturing the instantaneous interference cancellation gain after at least one stage of interference cancellation.

Thirdly, the load control is moved from the antenna buffer before interference cancellation to the antenna buffer after IC (1st stage). The noise rise relevant for stability is measured and controlled after a single stage of IC. The noise rise target for stability should be left as it is today. The DPCCH load should be calculated by scaling with the interference cancellation gain.

Fourthly, similar to the preceding alternative, but the statistical interference cancellation gain for DPCCH power scaling is used when the noise rise for stability is controlled after a single stage of interference cancellation.

Figure 5:
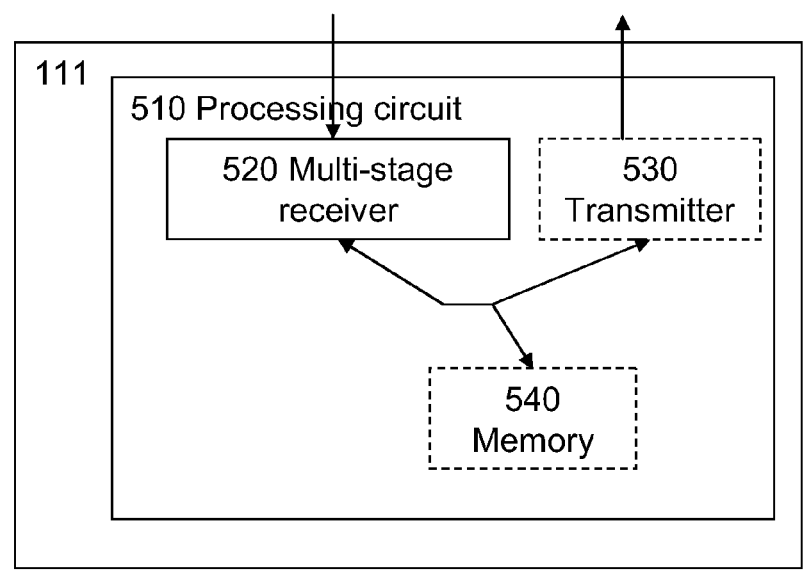
FIG. 5 shows a schematic block diagram, illustrating an exemplifying first network node configured to perform the methods illustrated in FIG. 4.

Now resuming discussions with reference to the Figures, a schematic block diagram of the first network node 111 is shown in FIG. 5. The first network node 111 is configured to perform the methods in FIG. 4. Thus, the first network node 111 is configured to control load in the first cell 121 of the first network node 111.

As mentioned, the first network node 111 is comprised in a radio communication network 100. A first and a second radio communication device 131, 132 are associated with the first cell 121. The third radio communication device 133 is associated with the second cell 122 of the radio communication network 100.

The first network node 111 comprises a processing circuit 510 configured to compute an interference cancellation gain, at an intermediate stage of the multi-stage receiver, during an interference cancellation process for reducing interference between uplinks signals transmitted by the first and second radio communication devices 131, 132.

Furthermore, the processing circuit 510 is configured to estimate neighbour cell interference from interfering signals transmitted by the third radio communication device 133 while accounting for a load utilization. The load utilization relates to power transmitted by the first and second radio communication devices 131, 132 and power granted to the first and second radio communication devices 131, 132.

The processing circuit 510 is further configured to:

calculate a load measure for stability based on at least the interference cancellation gain and the neighbour cell interference; and control load in the first cell 121 based on the load measure for stability. The load measure may comprise noise rise for stability.

The interference cancellation gain may comprise an instantaneous interference cancellation gain for a current transmission time interval. The instantaneous interference cancellation gain may be cell-specific or channel-specific.

According to some embodiments, the processing circuit 510 further is configured to compute an average interference cancellation gain over a number of transmission time intervals, wherein the average interference cancellation gain is determined based on a respective difference between a respective power measure for stability at an air interface of the multi-stage receiver and a respective power measure for stability after the intermediate stage of the receiver for each respective transmission time interval of the number of transmission time intervals.

Similar to the first set of embodiments, but now for the first network node 11, the processing circuit 510 may further be configured to:

obtain a load target for stability;

increase the load target for stability based to the computed interference cancellation gain;

control the load of the first cell 121 at an air interface of the multi-stage receiver while using the load target and the load measure.

Similar to the second set of embodiments, but now for the first network node 111, the processing circuit 510 may further be configured to:

determine a scaling factor based on the computed interference cancellation gain and the load measure;

calculate load factors based on the scaling factor;

control the load of the first cell 121 after the intermediate stage of the multi-stage receiver while using the determined load factors.

The processing circuit 510 may further br configured to jointly compute the load utilization and the neighbour cell interference.

The processing circuit 510 may be a processing unit, a processor, an application specific integrated circuit (ASIC), a field-programmable gate array (FPGA) or the like. As an example, a processor, an ASIC, an FPGA or the like may comprise one or more processor kernels.

The first network node 111 further comprises a multi-stage receiver 520 configured to cancel interference in multiple stages. The multi-stage receiver 520 may be configured to receive transmission from the first and second user equipments as scheduled by the first network node 111.

The first network node 110 may further comprise a transmitter 530, which may be configured to transmit, or send, uplink grants to the first and second user equipments.

The first network node 110 may further comprise a memory 540 for storing software to be executed by, for example, the processing circuit. The software may comprise instructions to enable the processing circuit to perform the method in the first network node 111 as described above in conjunction with FIG. 4. The memory 540 may be a hard disk, a magnetic storage medium, a portable computer diskette or disc, flash memory, random access memory (RAM) or the like. Furthermore, the memory may be an internal register memory of a processor.

Figure 6:
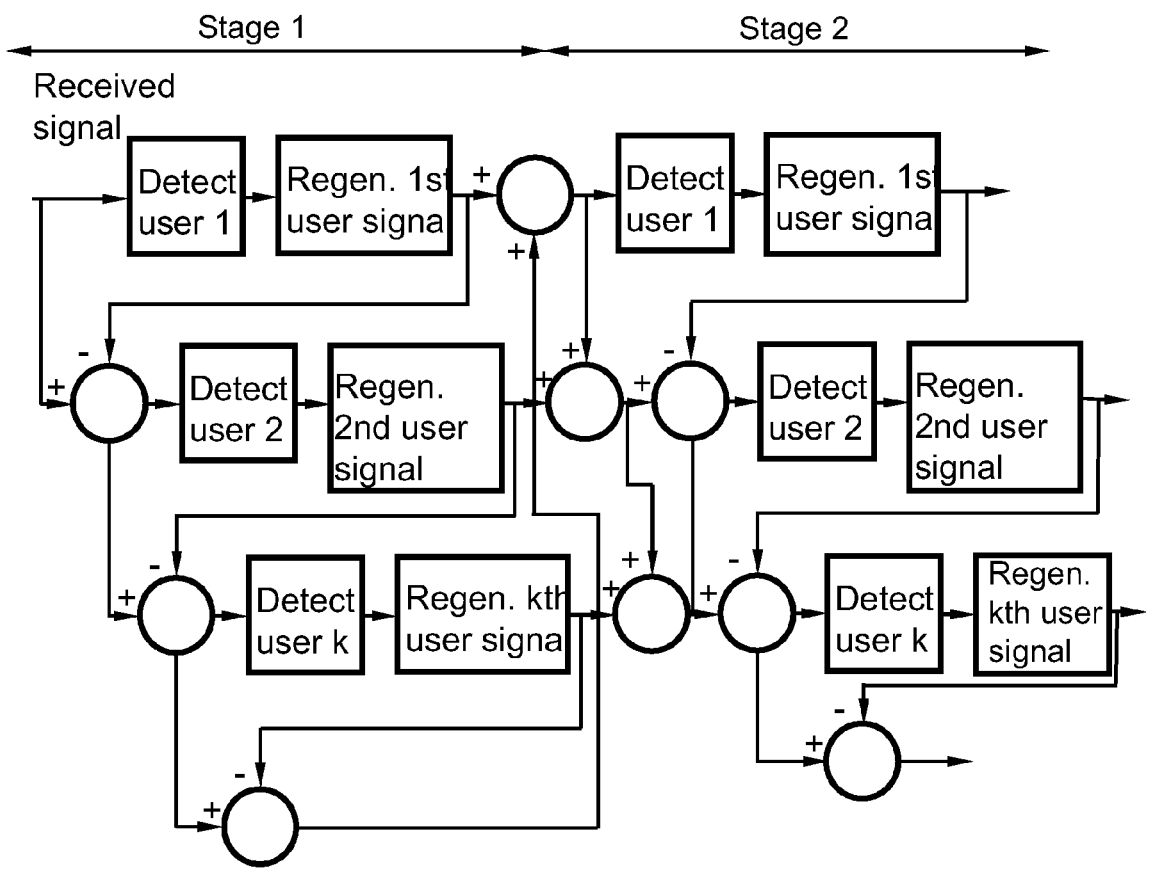
FIG. 6 is a schematic block diagram, illustrating an exemplifying multi-stage receiver according to prior art.

FIG. 6 illustrates a structure of Successive Interference Cancellation (SIC) as an example of the multi-stage receiver 520. The block diagram is shown for detected signals. As may be seen in FIG. 6, the detected signal of the first user equipment is immediately used to improve the conditions for all other user equipments, then the detected signal of the second user equipment is used to improve the conditions for all other user equipments but the first user equipment, and so on. This means that interference cancellation gains are achieved already at stage 1, however the delay of each stage will be dependent on the detection time of each user equipment. The delay may hence depend on the number of (interference cancellation) user equipments.

Other known multi-stages receivers include, but are not limited to, Parallel Interference Cancellation (PIC) receivers and Turbo-IC receivers.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a first network node for controlling load in a first cell of the first network node, wherein the first network node is comprised in a radio communication network, wherein the first network node comprises a multi-stage receiver for cancelling interference in multiple stages, wherein a first and a second radio communication device are associated with the first cell, wherein a third radio communication device is associated with a second cell of the radio communication network, wherein the method comprises:

computing an interference cancellation gain, at an intermediate stage of the multi-stage receiver, during an interference cancellation process for reducing interference between uplinks signals transmitted by the first and second radio communication devices;

estimating neighbour cell interference from interfering signals transmitted by the third radio communication device while accounting for a load utilization, wherein the load utilization is a ratio between power transmitted by the first and second radio communication devices and power granted to the first and second radio communication devices;

calculating a load measure for stability based on at least the interference cancellation gain and the neighbour cell interference; and controlling the load in the first cell based on the load measure for stability.

2. The method according to claim 1, wherein the computed interference cancellation gain comprises an instantaneous interference cancellation gain for a current transmission time interval.

3. The method according to claim 1, further comprising:

computing an average interference cancellation gain over a number of transmission time intervals, wherein the average interference cancellation gain is determined based on a respective difference between a respective power measure for stability at an air interface of the multi-stage receiver and a respective power measure for stability after the intermediate stage of the receiver for each respective transmission time interval of the number of transmission time intervals.

4. The method according to claim 1, further comprising:
obtaining a load target for stability;
increasing the load target for stability based to the computed interference cancellation gain; wherein the controlling of the load in the first cell further comprises:
controlling the load of the first cell at an air interface of the multi-stage receiver while using the load target and the load measure.

5. The method according to claim 1, further comprising:
determining a scaling factor based on the computed interference cancellation gain and the load measure;
calculating load factors based on the scaling factor; wherein the controlling of the load in the first cell further comprises:
controlling the load of the first cell after the intermediate stage of the multi-stage receiver while using the determined load factors.

6. The method according to claim 5, wherein the computed interference cancellation gain comprises the instantaneous interference cancellation gain.

7. The method according to claim 6, wherein the instantaneous interference cancellation gain is cell-specific or channel-specific.

8. The method according to claim 1, wherein the load utilization and the neighbour cell interference is computed jointly.

9. The method according to claim 1, wherein the load measure comprises noise rise for stability.

10. The method according to claim 1, wherein the first network node is a first radio network node, a first radio base station, a micro base station, a femto base station, a home NodeB or a first Node B.

11. A first network node configured to control load in a first cell of the first network node, wherein the first network node is comprised in a radio communication network, wherein the first network node comprises a multi-stage receiver for cancelling interference in multiple stages, wherein a first and a second radio communication device are associated with the first cell, wherein a third radio communication device is associated with a second cell of the radio communication network, wherein the first network node comprises:
a processing circuit configured to compute an interference cancellation gain, at an intermediate stage of the multi-stage receiver, during an interference cancellation process for reducing interference between uplinks signals transmitted by the first and second radio communication devices, wherein the processing circuit further is configured to:
estimate neighbour cell interference from interfering signals transmitted by the third radio communication device while accounting for a load utilization, wherein the load utilization is a ratio between power transmitted by the first and second radio communication devices and power granted to the first and second radio communication devices;
calculate a load measure for stability based on at least the interference cancellation gain and the neighbour cell interference; and
control load in the first cell based on the load measure for stability.

12. The first network node according to claim 11, wherein the interference cancellation gain comprises an instantaneous interference cancellation gain for a current transmission time interval.

13. The first network node according to claim 11, wherein the processing circuit further is configured to:
compute an average interference cancellation gain over a number of transmission time intervals, wherein the average interference cancellation gain is determined based on a respective difference between a respective power measure for stability at an air interface of the multi-stage receiver and a respective power measure for stability after the intermediate stage of the receiver for each respective transmission time interval of the number of transmission time intervals.

14. The first network node according to claim 11, wherein the processing circuit further is configured to:
obtain a load target for stability;
increase the load target for stability based to the computed interference cancellation gain;
control the load of the first cell at an air interface of the multi-stage receiver while using the load target and the load measure.

15. The first network node according to claim 11, wherein the processing circuit further is configured to:
determine a scaling factor based on the computed interference cancellation gain and the load measure;
calculate load factors based on the scaling factor;
control the load of the first cell after the intermediate stage of the multi-stage receiver while using the determined load factors.

16. The first network node according to claim 15, wherein the interference cancellation gain comprises the instantaneous interference cancellation gain.

17. The first network node according to claim 16, wherein the instantaneous interference cancellation gain is cell-specific or channel-specific.

18. The first network node according to claim 11, wherein the processing circuit further is configured to jointly compute the load utilization and the neighbour cell interference.

19. The first network node according to claim 11, wherein the load measure comprises noise rise for stability.

20. The first network node according to claim 11, wherein the first network node is a first radio network node, a first radio base station, a micro base station, a femto base station, a home NodeB or a first Node B.

* * * * *